(12) United States Patent
Sato et al.

(10) Patent No.: US 7,050,645 B2
(45) Date of Patent: May 23, 2006

(54) IMAGE PROCESSING APPARATUS AND IMAGE PROCESSING METHOD

(75) Inventors: Shinichi Sato, Yokohama (JP); Toshiaki Watanabe, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 637 days.

(21) Appl. No.: 09/891,165

(22) Filed: Jun. 26, 2001

(65) Prior Publication Data

US 2002/0012474 A1  Jan. 31, 2002

(30) Foreign Application Priority Data

Jul. 6, 2000  (JP) .............................. 2000-205083

(51) Int. Cl.
  *G06K 9/36* (2006.01)
  *G06K 9/46* (2006.01)
(52) U.S. Cl. ...................... 382/250; 382/166; 382/251; 358/426.14
(58) Field of Classification Search ................ 382/162, 382/166, 232–253; 358/3.01–3.09, 426.01–426.16
See application file for complete search history.

(56) References Cited

U.S. PATENT DOCUMENTS

| | | | | |
|---|---|---|---|---|
| 4,652,935 A | * | 3/1987 | Endoh et al. | .......... 358/426.11 |
| 5,321,440 A | * | 6/1994 | Yanagihara et al. | ...... 375/240.2 |
| 5,608,862 A | * | 3/1997 | Enokida | ...................... 345/501 |
| 5,675,384 A | * | 10/1997 | Ramamurthy et al. | . 375/240.04 |
| 5,710,636 A | * | 1/1998 | Curry | ......................... 358/3.28 |
| 5,742,704 A | * | 4/1998 | Suzuki et al. | ................ 382/176 |
| 5,987,176 A | * | 11/1999 | Imaizumi et al. | ........... 382/232 |
| 6,175,653 B1 | * | 1/2001 | de Queiroz | ................. 382/233 |
| 6,307,962 B1 | * | 10/2001 | Parker et al. | ................ 382/170 |
| 6,459,816 B1 | * | 10/2002 | Matsuura et al. | ........... 382/248 |
| 6,532,307 B1 | * | 3/2003 | Sato | .......................... 382/240 |
| 6,700,933 B1 | * | 3/2004 | Wu et al. | .............. 375/240.16 |
| 6,804,402 B1 | * | 10/2004 | Andrew | ...................... 382/240 |

FOREIGN PATENT DOCUMENTS

| | | |
|---|---|---|
| JP | 10290462 | 10/1998 |
| JP | 2000-134459 | 5/2000 |
| JP | 2000134459 A * | 5/2000 |

OTHER PUBLICATIONS

English Language Abstract of JP 10-290462.
English Language Abstract of JP 2000-134459.
English Language Abstract of JP 10-290462.
English Language Abstract of JP 2000-134459.

* cited by examiner

*Primary Examiner*—Bhavesh M. Mehta
*Assistant Examiner*—Yubin Hung
(74) *Attorney, Agent, or Firm*—Greenblum & Bernstein, P.L.C.

(57) ABSTRACT

The image processing apparatus transforms orthogonal transform coefficients into a predetermined number of bits for each spatial frequency, rearranges quantized data for each spatial frequency to an arrangement with spatial frequency band portions, thereby generates bit serial data that the quantized data of the same spatial frequency band exists successively over adjacent blocks, and compresses the bit serial data.

10 Claims, 16 Drawing Sheets

| HA03 (AC600dpi COMPONENT) | HA13 (AC600dpi COMPONENT) | HA23 (AC600dpi COMPONENT) | HA33 (AC600dpi COMPONENT) |
|---|---|---|---|
| HA02 (AC600dpi COMPONENT) | HA12 (AC600dpi COMPONENT) | HA22 (AC600dpi COMPONENT) | HA32 (AC600dpi COMPONENT) |
| HA01 (AC300dpi COMPONENT) | HA11 (AC300dpi COMPONENT) | HA21 (AC600dpi COMPONENT) | HA31 (AC600dpi COMPONENT) |
| HA00 (DC COMPONENT) | HA10 (AC300dpi COMPONENT) | HA20 (AC600dpi COMPONENT) | HA30 (AC600dpi COMPONENT) |

FIG. 5

ACTUAL BIT MAP DATA SUBJECTED TO FREQUENCY BANDING

PAGE MEMORY WRITE ORDER

| E00 F | E10 F | E20 F | E30 F |
|---|---|---|---|
| E01 F | E11 F | E21 F | E31 F |
| E02 F | E12 F | E22 F | E32 F |
| E03 F | E13 F | E23 F | E33 F |
| E04 F | E14 F | E24 F | E34 F |

COUNTERCLOCKWISE 90 ROTATION

PAGE MEMORY READ ORDER
$F_{x,y}[31:0] = E_{3-y,x}[31:0]$

| E30 F | E31 F | E32 F | E33 F | E34 F |
|---|---|---|---|---|
| E20 F | E21 F | E22 F | E23 F | E24 F |
| E10 F | E11 F | E12 F | E13 F | E14 F |
| E00 F | E01 F | E02 F | E03 F | E04 F |

NOTE) F IS INDICATIVE OF DIRECTION OF IMAGE IN BLOCK

BLOCK ROTATION EDITING PROCESSING

FIG. 11

IMAGE COMBINING EDITING PROCESSING

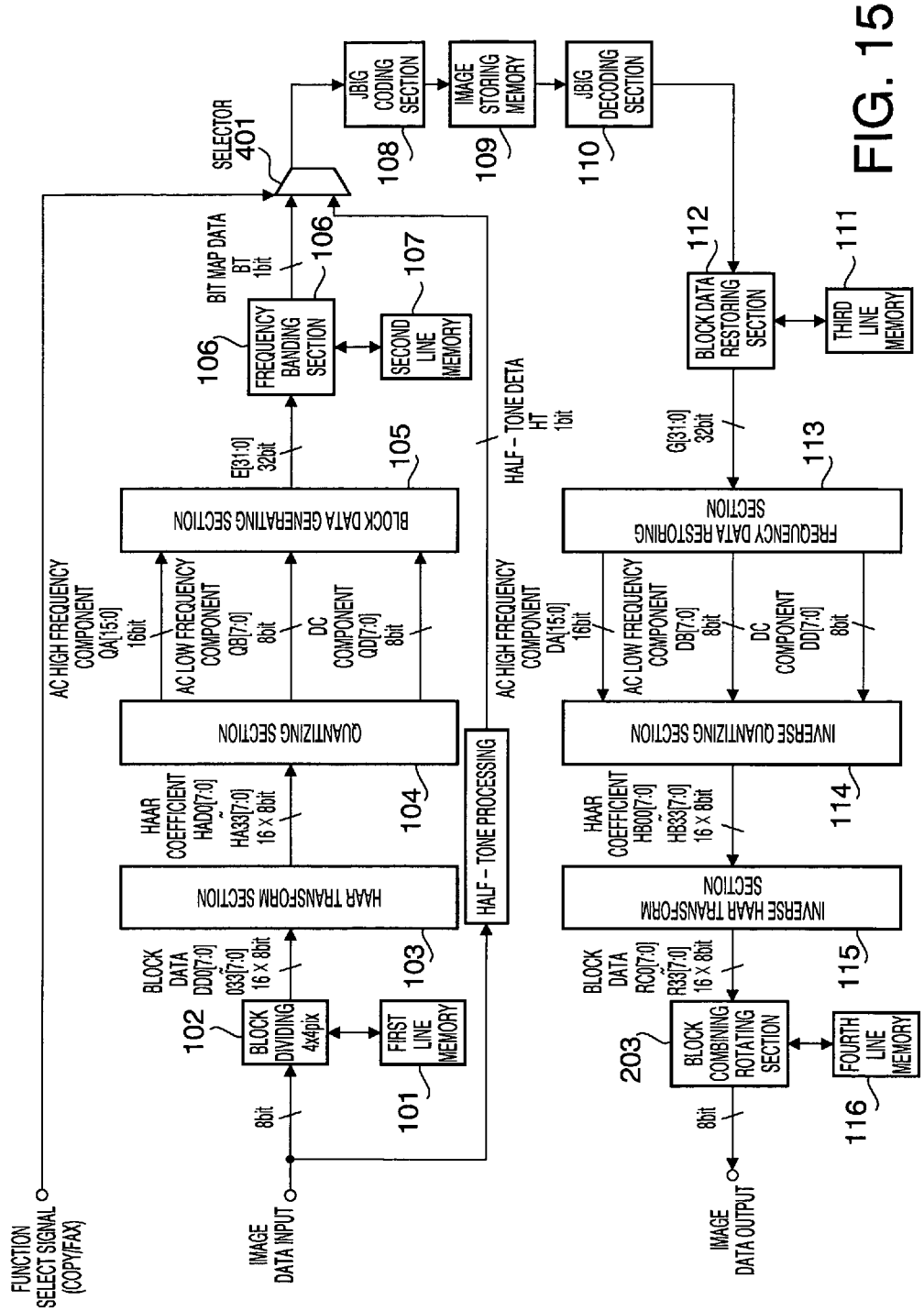

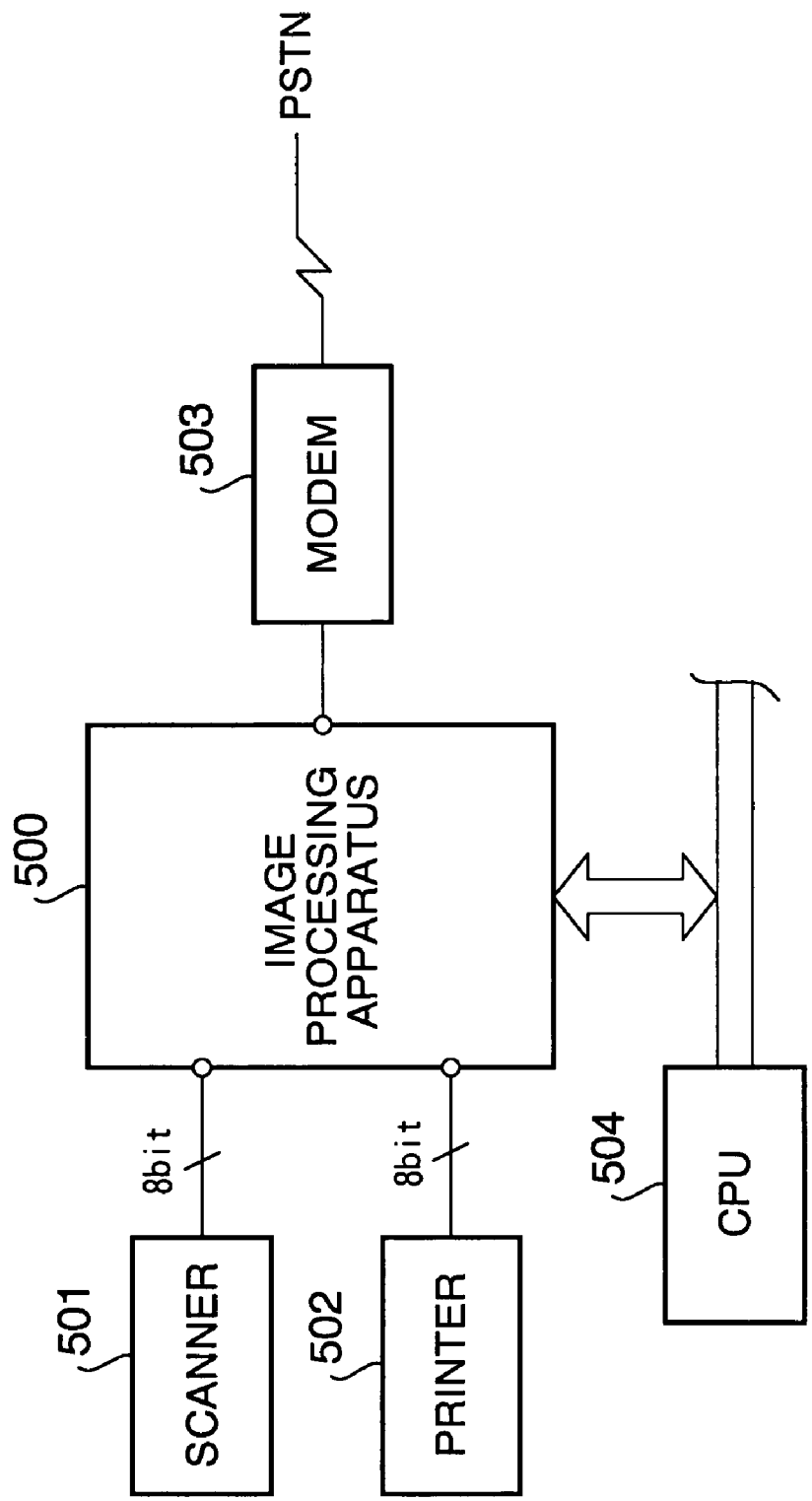

IMAGE PROCESSING APPARATUS AND IMAGE PROCESSING METHOD

BACKGROUND OF THE INVENTION

1. Field of the Invention

The present invention relates to an image processing apparatus and method for compressing/decompressing image data, and more particularly to an image processing apparatus applicable to a copy machine using a printer capable of tone-printing multi-bit image data with continuous tones scanned by a scanner, etc.

2. Description of the Related Art

A conventional digital copy machine stores image data scanned through a scanner in an imagememory, performs editing such as rotation and combining to the data, and reads the resultant data from the image memory to output/print from a printer. For example, with respect to an original placed on a scanning surface with its longitudinal direction parallel to the scanning direction, in the case where recording paper is fed to the printer with its longitudinal direction vertical to the printing direction, the machine is capable of flexibly coping with such a case while rotating the image data scanned from the scanner to suit the recording paper direction.

Meanwhile, a multi-bit printer has been developed which is capable of printing intermediate data as well as binary data. The multi-bit printing enables the image data that has been represented by 1 bit per pixel to be represented by multi-bit data of two or more bits per pixel, and thereby is capable of printing images with continuous tones and of improving the image quality.

When the multi-bit image data is handled, its data amount increases to a few times that of the binary image data, and therefore requires an image memory with a large storage capacity for storing image data, thereby increasing the cost. It is possible to suppress the memory capacity by compressing the image data to store, however, there is a problem that compressed image data cannot be edited depending on the compression system. For example, since the JPEG coding that is a compressing system widely used is of variable-length coding, information on pixel positions is not stored and the editing is difficult. The editing, therefore, should be performed at the former stage of the JPDG coding as illustrated in FIG. 1, however, even in this scheme, the capacity of an editing memory increases and the cost increases. Further, since an editing data amount is large, there occurs a disadvantage that a memory accessing speed needs to be increased not to decrease the processing speed.

In the case of a digital copy machine with both the copy function and facsimile transmission/reception function, when a compression system such as the JPEG system is used which is different from the JBIG system that is one of the compression systems of facsimile standard, the machine needs to be provided with two coding/decoding systems, thereby resulting in problems of increased large circuit scale and increased cost.

In order to cope with such problems, such a method is considered that performs half-tone processing on the multi-bit continuous tone data prior to compression, storage and decompression. As illustrated in FIG. 2, image data is first subjected to half-tone processing to be converted into binary data, and the binary data is rotated by block rotation processing using editing memory 11. Then, the data is subjected to the coding (JBIG coding) of facsimile standard, and the compressed image is stored in image storing memory 12. The compressed image is read from image storing memory 12 to be decoded (JBIG decoding), the decompressed half-tone data is subjected to multi-bit estimating processing to estimate multi-bit image data, and the resultant data is output as multi-bit continuous tone data.

However, since the method for performing the half-tone processing prior to compression, storage and decompression uses a spatial filter with spatial frequency characteristics of a low-pass type as means for estimating the multi-bit image data, there are problems that a blurred portion occurs on a decompressed image, uneven frequencies caused by the half-tone processing are not attenuated sufficiently, and that the image quality deteriorates greatly.

SUMMARY OF THE INVENTION

It is an object of the present invention to provide an image processing apparatus for achieving image coding/decoding which enables an image to be restored with accuracy and with no image quality deterioration even when the image is compressed and then edited, which enables the suppression of an increase in a required memory capacity, and which is suitable for coding and decoding of facsimile standard such as JBIG.

The image processing apparatus of the present invention transforms orthogonal transform coefficients into a predetermined number of bits for each spatial frequency, rearranges quantized data for each spatial frequency to an arrangement with spatial frequency band portions, thereby generates bit serial data that the quantized data of the same spatial frequency band exists successively over adjacent blocks, and compresses the bit serial data.

It is thereby possible to suppress an increase in a memory capacity required for editing the quantized data, and the bit serial data that the quantized data of the same spatial frequency band exists successively over adjacent blocks is suitable for the coding and decoding of facsimile standard such as JBIG.

A first aspect of the present invention is an image processing apparatus provided with an orthogonal transform section that transforms multi-bit image data of a predetermined block size into orthogonal transform coefficients corresponding to spatial frequencies, a quantizing section that transforms the orthogonal transform coefficients for each spatial frequency into a predetermined number of bits, a banding section that rearranges the quantized data for each spatial frequency to an arrangement with spatial frequency band portions to generate bit serial data that the quantized data of the same spatial frequency band exists successively over adjacent blocks, and a coding section that compresses the bit serial data.

According to the image processing apparatus configured as described above, it is possible to suppress an increase in a memory capacity required for editing the quantized data, and the bit serial data that the quantized data of the same spatial frequency band exists successively over adjacent blocks is suitable for the coding and decoding of facsimile standard such as JBIG.

A second aspect of the present invention provides the above-mentioned image processing apparatus with a decompressing section that decompresses the data compressed in the coding section, a frequency component decoding section that decodes quantized data of each spatial frequency component from decompressed bit serial data for each block, an inverse quantizing section that performs inverse quantization on the decoded quantized data of each spatial frequency component to decompress the orthogonal transform coefficients, an inverse orthogonal transform section that restores an original block image from the decompressed orthogonal transform coefficients, and a block combining section that combines the restored block image to generate original multi-bit image data.

According to the above constitution, it is possible to edit the compressed image data in a series of processes of compression, storage and decompression of multi-bit image data, and to output the edited image by restoring the compressed image and combining the block images.

A third aspect of the present invention provides the above-mentioned image processing apparatus with a half-tone processing section that transforms the multi-bit image data into half-tone data, and a function selecting section that selects data to be input to the coding section from the half-tone data and the bit serial data corresponding to a function selecting signal for instructing an copy operation or facsimile transmission, where when the facsimile transmission is selected, the apparatus outputs the coded data to an outside.

It is thereby possible to select as a function the copy operation or facsimile transmission when the coding section is used as a facsimile coder.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 5 is a diagram illustrating HAAR transform coefficients rearranged in the order of frequency;

FIG. 11 is a conceptual diagram of block rotation editing processing;

FIG. 15 is a block diagram of an image processing apparatus according to a fourth embodiment; and FIG. 16 is a diagram illustrating an entire configuration of a multifunctional apparatus.

DETAILED DESCRIPTION OF THE PREFERRED EMBODIMENTS

Embodiments of an image processing apparatus according to the present invention will be described below with reference to accompanying drawings.

First Embodiment

Figure 1:
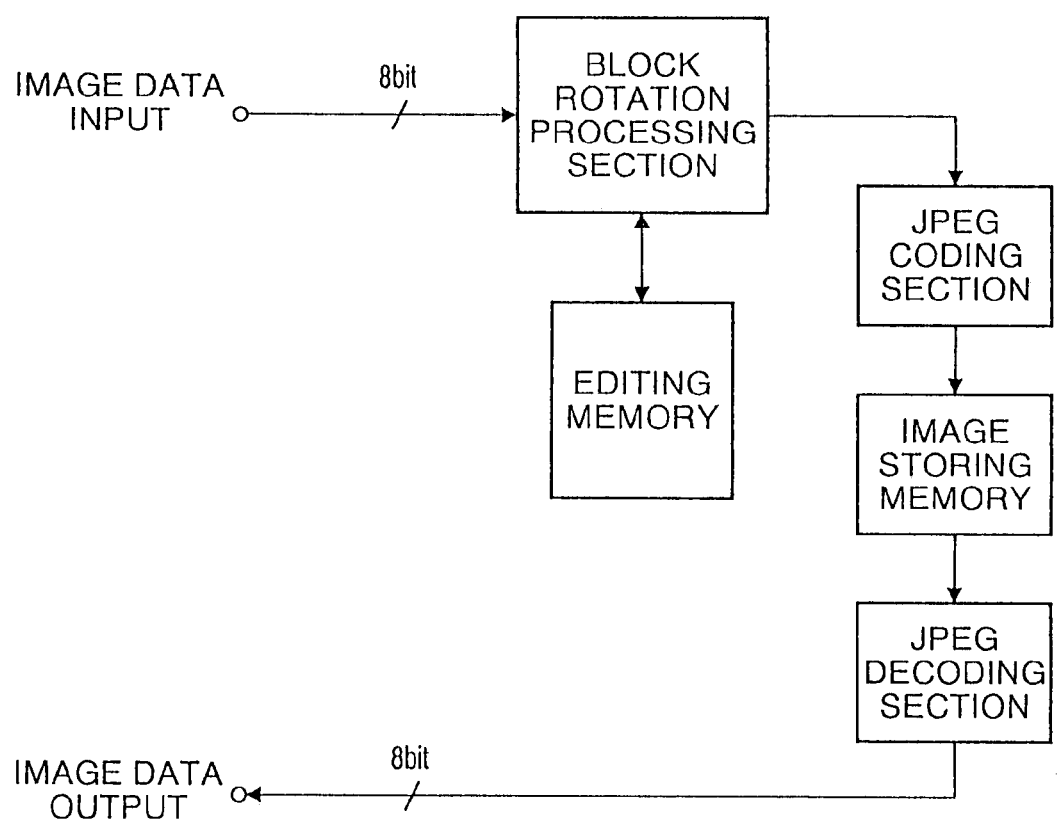
FIG. 1 is a block diagram of a conventional example of processing editing before performing JPEG coding.
Figure 2:
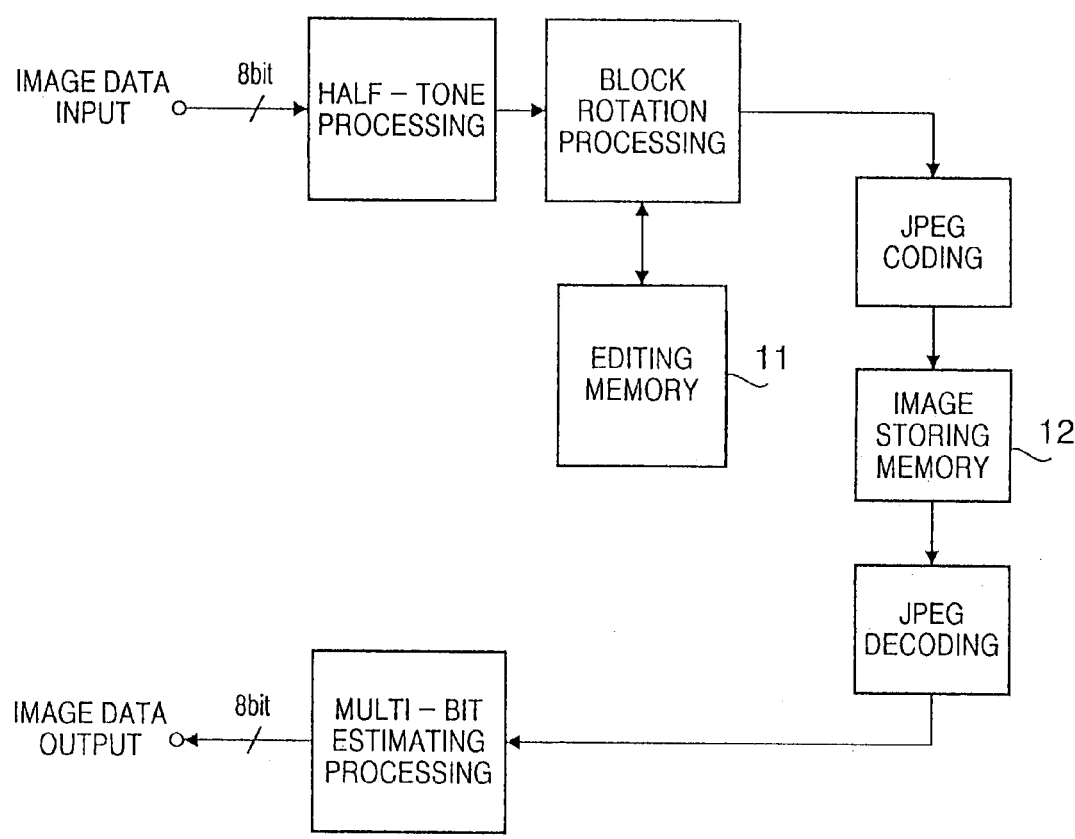
FIG. 2 is a block diagram of a conventional example of performing JBIG coding after performing half-tone processing.
Figure 3:
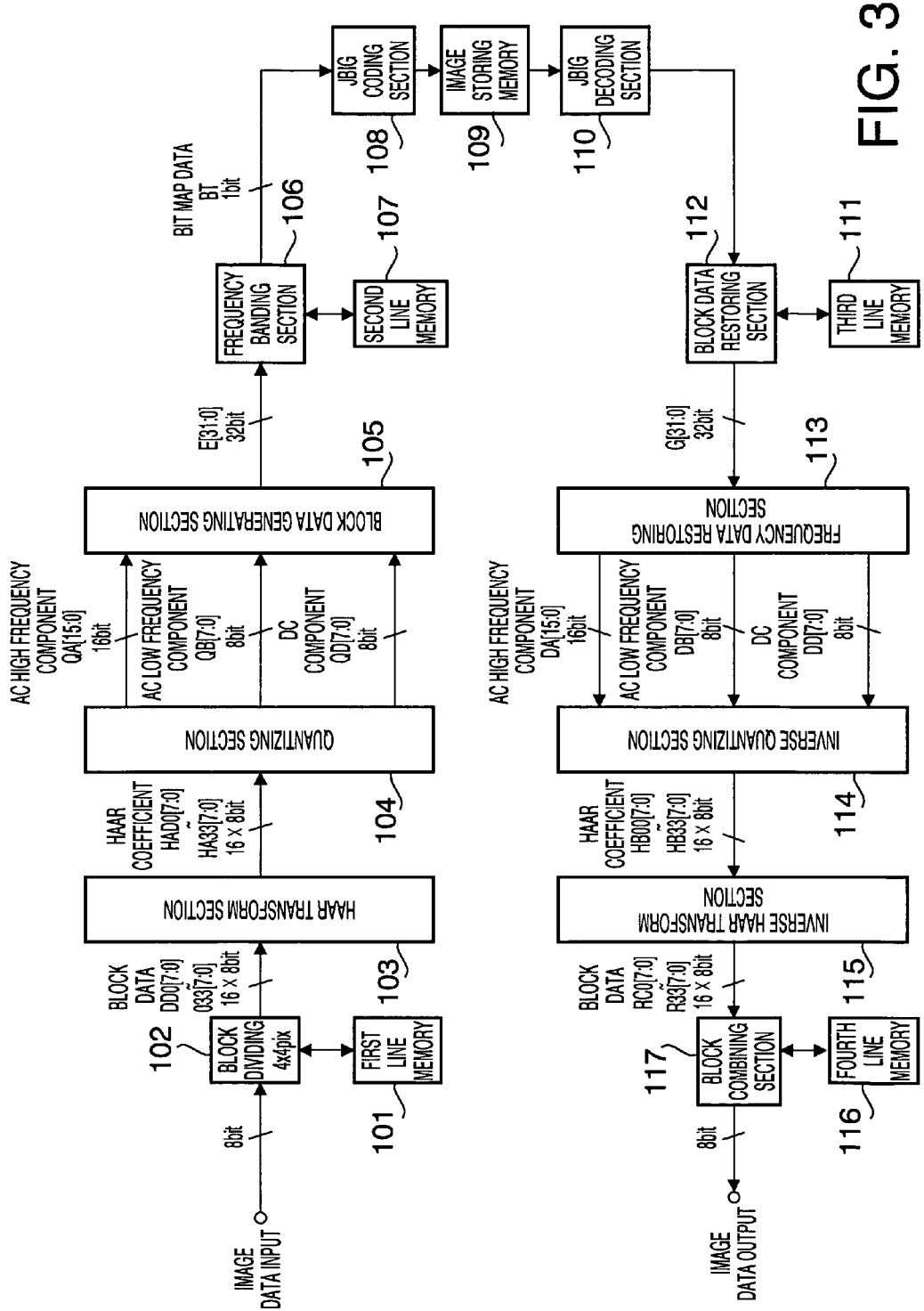
FIG. 3 is a block diagram of an image processing apparatus according to a first embodiment.

FIG. 3 is a block diagram of a configuration pertaining to a series of processes of compression, storage and decompression of an image processing apparatus according to the first embodiment. In this embodiment, the JBIG system of facsimile standard is used as a coding/decoding system.

In the image processing apparatus illustrated in FIG. 3, image data is sequentially written in first line memory 101. The image data in this embodiment is assumed to be multi-bit data having continuous tones with each pixel represented by a predetermined number of bits such as, for example, but not limited to, 8 bits. Block dividing section 102 controls a read address of first line memory 101, and outputs block data of a size of 4 ×4 pixels for each block to HAAR transform section 103. HAAR transform section 103 performs HAAR transform that is one of orthogonal transforms on the block data of 4 ×4 pixels to obtain HAAR coefficients.

Figure 4:
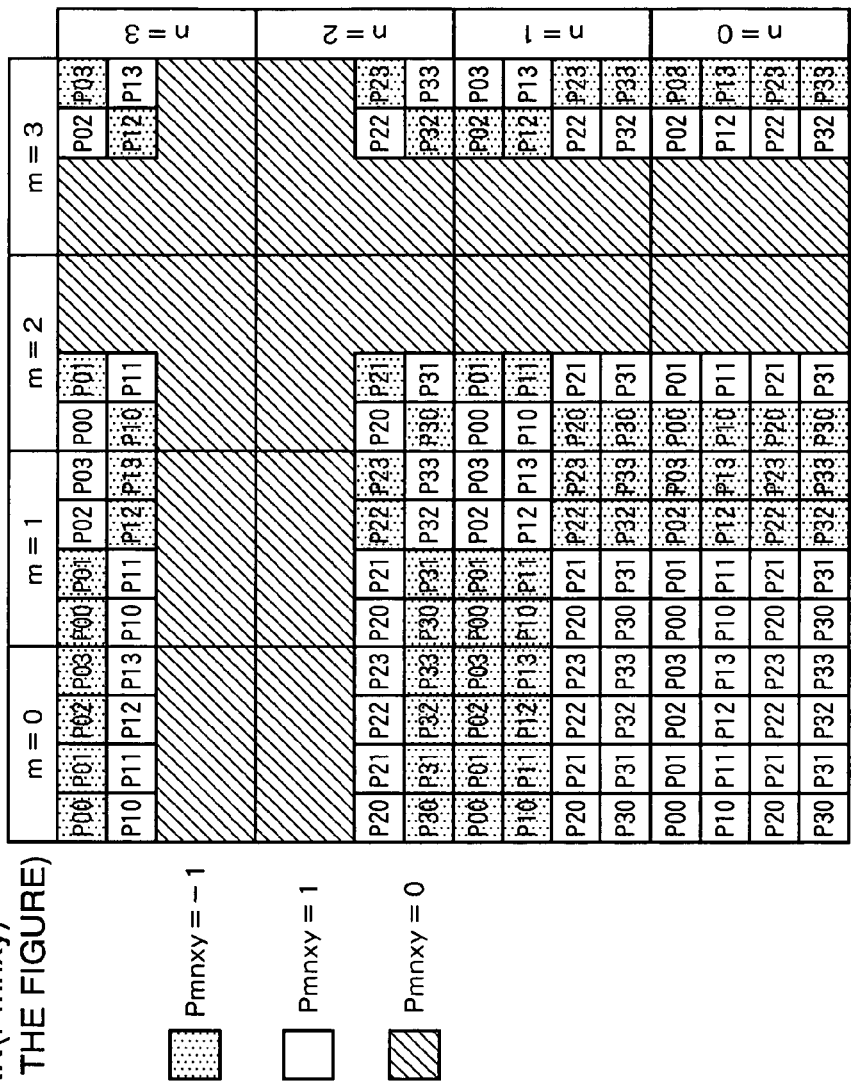
FIG. 4 is a primary pattern diagram for use in HAAR transform.

FIG. 4 is an example of a primary pattern for use in the HAAR transform. The HAAR transform is processing for transforming 4×4 items of image data (Dxy) into 4 ×4HAAR coefficients (HAmn). Using a position of an input image (x,y) and a primary pattern (Pmnxy) determined by a primary vector number (m,n) of the HAAR coefficient, the following calculation is performed:

$$HAmn = \sum_{x=0}^{3} \sum_{y=0}^{3} Pmnxy \times Dxy \quad (m = 0, 1, 2, 3 \quad n = 0, 1, 2, 3)$$

FIG. 5 is a diagram illustrating HAAR coefficients obtained by the HAAR transform. The HAAR coefficient [HA00] at a lower left portion is a DC component, and the coefficients are arranged so that the frequency is increased in the diagonal direction from [HA00] to [HA33]. In this embodiment, each HAAR coefficient (HAmn) is represented by 8 bits. The HAAR coefficient (HAmn) calculated in HAAR transform section 103 is input to quantizing section 104.

Figure 6:
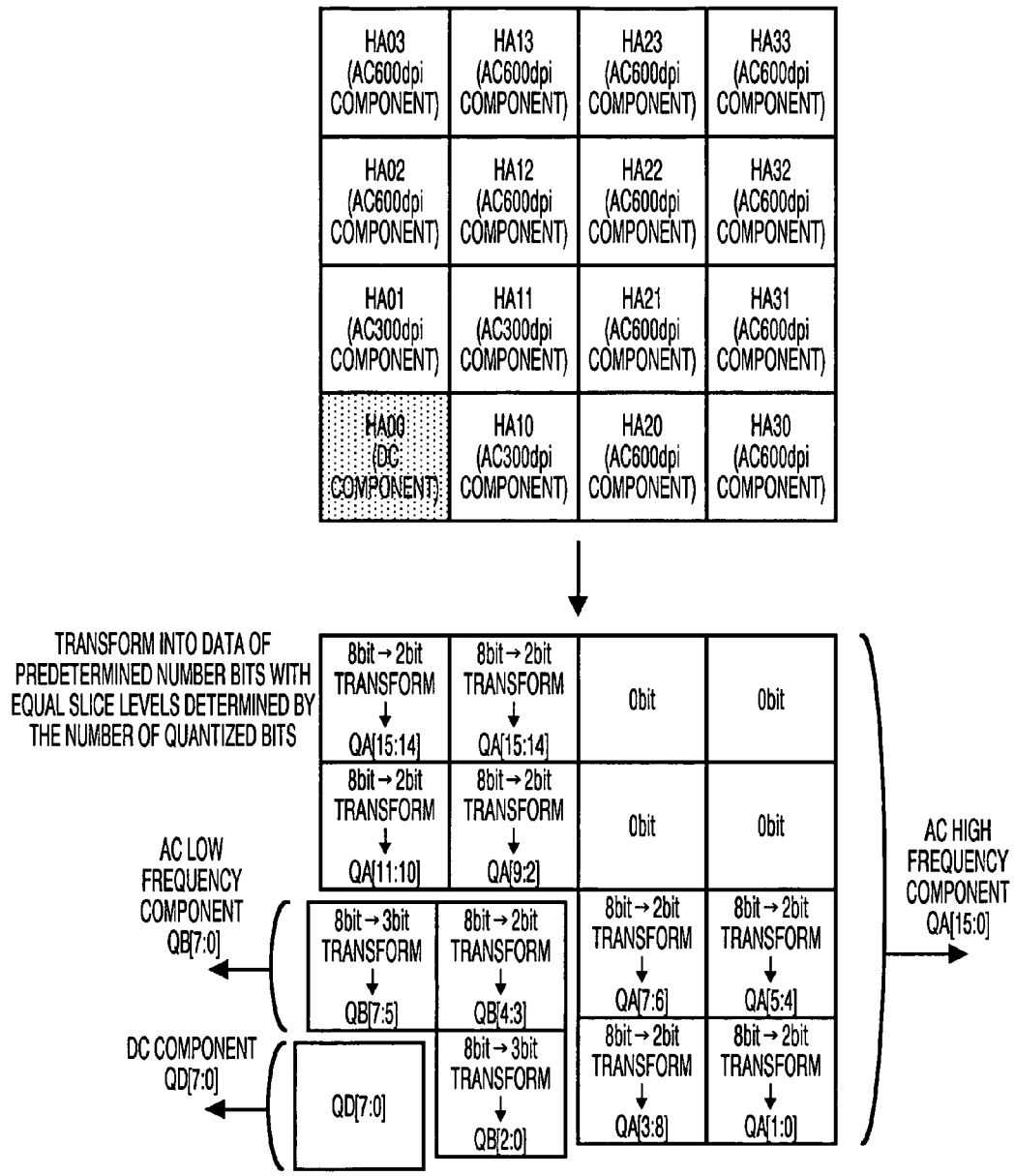
FIG. 6 is a conceptual diagram of quantization processing in the first embodiment of the present invention.

Quantizing section 104 quantizes the HAAR coefficient of 8 bits using the number of quantization bits determined corresponding to a frequency component and position on a 4×4 matrix. FIG. 6 illustrates a specific example of the quantization processing. As illustrated in FIG. 6, in the assignment of the number of quantization bits, a DC component is assigned the number of bits (8 in this embodiment) needed to represent continuous tones, while in AC components, the larger number of bits is assigned as the frequency is decreased. It is because generally, quantizing an AC component rough in a half-tone tone image does not affect a half-tone image quality since a small number of AC components exist in the half-tone image, and in a character image, a large number of AC components exist on an edge portion of a character, however, high-bit accuracy is not required unlike the half-tone. Further, since a small number of slant components of high frequency exist in a general image and the effect of such components on the image quality is small, the number of quantization bits is set to 0 in this embodiment.

Block data generating section 105 receives the quantized data quantized as described above from quantizing section 104. The section 105 generates block data (E) of total 32 bits, namely, 8 bits for DC components (QD), 8 bits for AC low frequency components (QB) and 16 bits for AC high frequency components (QA). The block data (E) is written in second line memory 107 by frequency banding section 106.

As described above, the image data is subjected to the HAAR transform to obtain HAAR coefficients, and the coefficients are quantized to be transformed into quantized coefficients, whereby, the image data of a block with 16×8 bits is compressed into data (quantized coefficient) of 32 bits. Since the compression processing until this stage is of fixed-length coding, it is possible to compress the compressed data even with the editing such as rotation processed thereon, and to suppress an amount of a memory for the editing to small suitable for an amount of compressed data.

Figure 7:
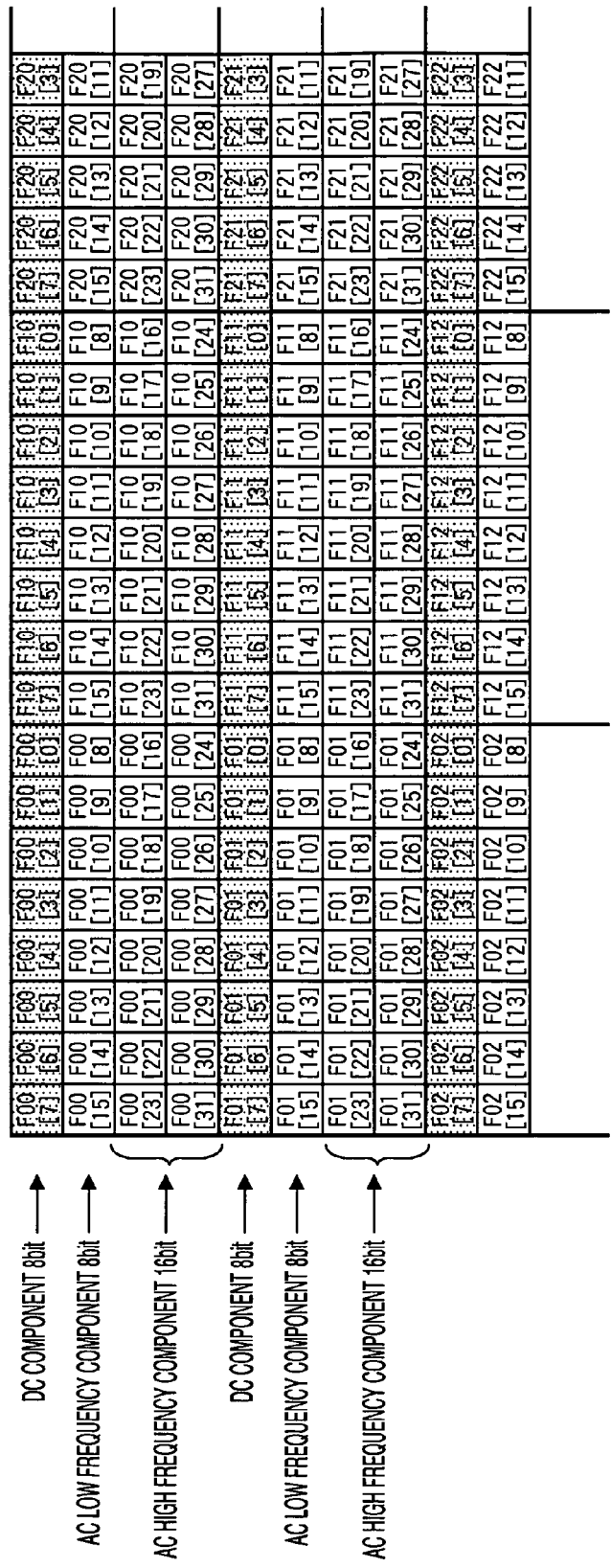
FIG. 7 is a bit map pattern diagram obtained after frequency banding processing in the first embodiment.

FIG. 7 is a diagram illustrating a data arrangement of quantized data written in second line memory 107. With the arrangement such that quantized data of a block is sorted into frequency band portions, i.e., CD component (QD) band portion, AC low frequency component (QB) band portion and AC high frequency component (QA) band portion, bit serial data of each frequency component is written in second line memory 107. By reading addresses successive in the main scanning direction (horizontal direction) in the arrangement diagram illustrated in FIG. 7, it is possible to output the data of the same frequency band over adjacent blocks as a bit serial sequence.

When frequency banding section 106 reads the data of the same frequency band over adjacent blocks as a bit serial sequence, the section 106 codes the AC band portions so that 0 of each AC component data corresponds to a white dot on a bit map, while making a pattern of the DC band portion so that DC component data of a white state in FF (hex) corresponds to white 8 dots.

Figure 8:
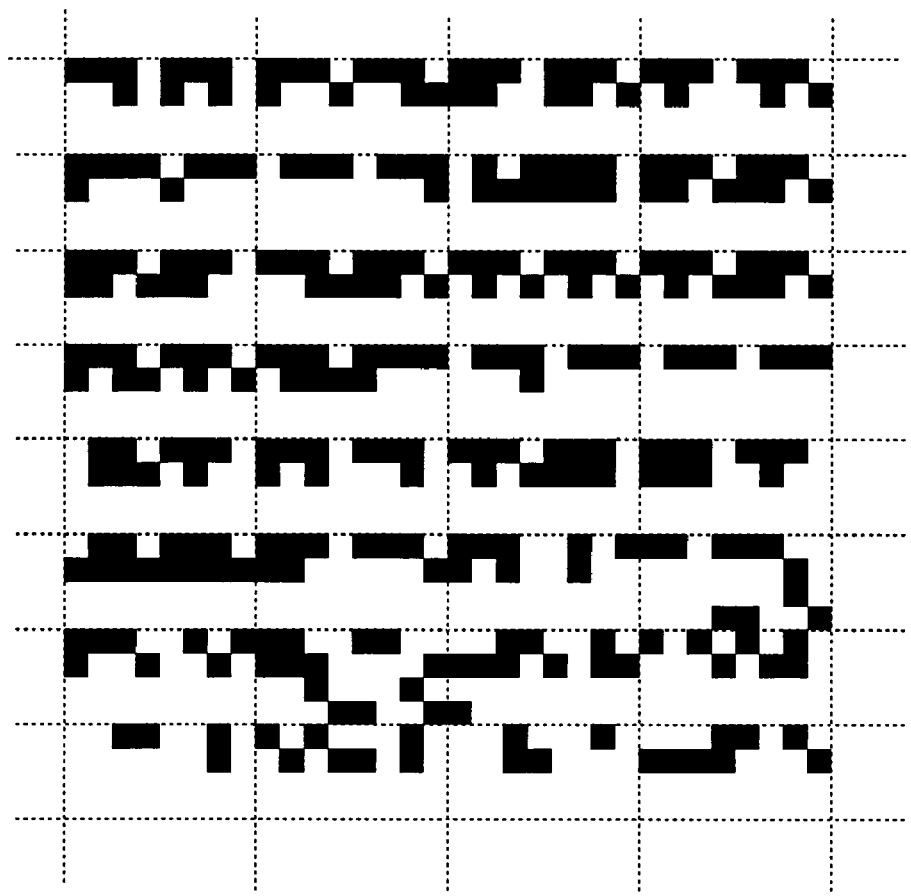
FIG. 8 is a bit map pattern diagram obtained by actually performing the frequency banding processing on a sample.

FIG. 8 illustrates actual bit map data obtained by subjecting quantized coefficients of a half-tone image to the frequency banding. A column divided by broken line corresponds to a block. Black images appear irregularly in the DC band, less block images appear in the AC low frequency band, and a white portion is almost left in the AC high frequency band. It is because less high frequency components exist in a half-tone image and in the background portion of a character. Further, in a character original, AC components are not generated in the background portion, and a white portion (255 level in 8-bit input) forms a white-dot-successive image in both the DC band and AC band.

In a general image, white dots appear frequently in the shape of a band or a block. Since the JBIG coding increases the compression efficiency as the number of successive dots of white or black is large in two dimension, the binary image pattern as illustrated in FIG. 8 where white dots appear frequently in the shape of a band or a block is considered to be an image enabling the most increased compression efficiency in the JBIG coding.

Thus, in the present invention, the first-stage compression processing provides the compression enabling the editing, while generating a bit map pattern enabling the most increased compression efficiency in the JBIG coding that is executed in second-stage compression.

The binary image data with bit serial sequences is read from second line memory 107, JBIG coding section 108 codes the data by the JBIG system of facsimile standard, and the coded data is stored in image storing memory 109 for each page. The page data compressed by the JBIG coding is subjected to page rearrangement, electronic filing, etc. on image storing memory 109.

The compressed page data is read from image storing memory 109, is subjected to the JBIG decoding in JBIG decoding section, and thereby is restored to bit map data. Block data restoring section 112 writes the data in third line memory 111. The section 112 controls a write address so that the bit map pattern arrangement illustrated in FIG. 7 is restored.

When restored data corresponding to four lines is written in third line memory 111, frequency component decoding section 113 reads out data of a block comprised of 32 bits, for each block of 8×4 bits enclosed by solid line in FIG. 7 to decode the DC components (DD) of 8 bits, AC low frequency components (DB) of 8 bits and AC high frequency components (DA) of 16 bits. The DC components (DD), AC low frequency components (DB) and AC high frequency components (DA) decoded in frequency component decoding section 113 are input to inverse quantizing section 114 for each block.

Figure 9:
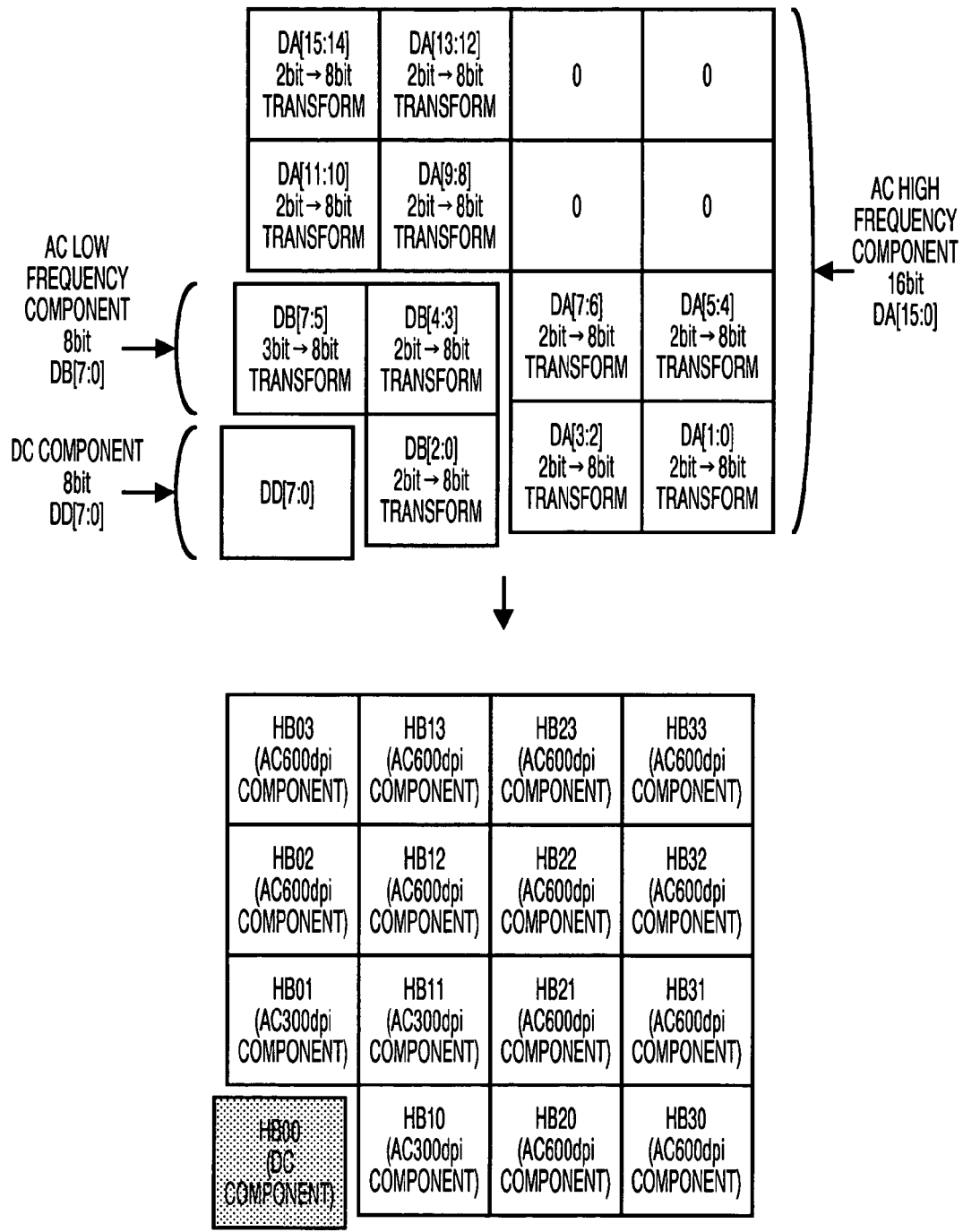
FIG. 9 is a conceptual diagram of inverse quantization processing in the first embodiment.

FIG. 9 is a conceptual diagram of inverse quantization executed in inverse quantizing section 114. As illustrated in FIG. 9, inverse quantizing section 114 transforms the quantized coefficient into 8 bits by simple proportion calculation according to the number of quantization bits determined corresponding to the frequency and a position condition in the same way as in quantization, to decompress the HAAR coefficient. The decompressed HAAR coefficient is provided to inverse HAAR transform section 115.

Inverse HAAR transform section 115 subjects the decompressed HAAR coefficient (HBmn) to the inverse HAAR transform using a primary pattern, and thereby transforms into image data. Specifically, the transform is such processing that transforms 4×4 HAAR coefficients (HBmn) into 4×4 items of image data (Rxy), and is performed by calculating the following equation using a primary vector number (m,n) of an input HAAR coefficient, output image data position (x,y) and primary pattern (Pmnxy).

$$Rxy = \sum_{m=0}^{3} \sum_{n=0}^{3} Pmnxy \times HAmn \quad (x = 0, 1, 2, 3 \quad y = 0, 1, 2, 3)$$

The image data (Rxy) obtained by the inverse HAAR transform is written in fourth line memory 116 for each block by combining section 117. The image data is read from fourth line memory 116 for each line, and thereby restored image data is output.

As described above, according to the present invention, the first-stage data compression by the fixed-length coding is achieved by performing the HAAR transform on image data for each block and quantizing the HAAR coefficient, whereby performing image editing on thus compressed data enables the suppression of an editing memory capacity. Further, the quantized coefficients (DC components (8 bits), AC low frequency components (8 bits) and AC high frequency components (16 bits) obtained by quantizing the HAAR transform coefficients are arranged for each frequency (in the form of a band) in their bit serial states, and the bit map data composed of the bit serial data in the form of a band is subjected to JBIG coding that is the second-stage compression, whereby it is possible to achieve a higher compression rate than a case of compressing bit map data without the band form.

Second Embodiment

An image processing apparatus according to the second embodiment of the present invention will be described next.

The image processing apparatus of this embodiment is an example enabling image data to be rotated every 90 degrees at a stage where the HAAR coefficients are quantized and then the block data is generated.

Figure 10:
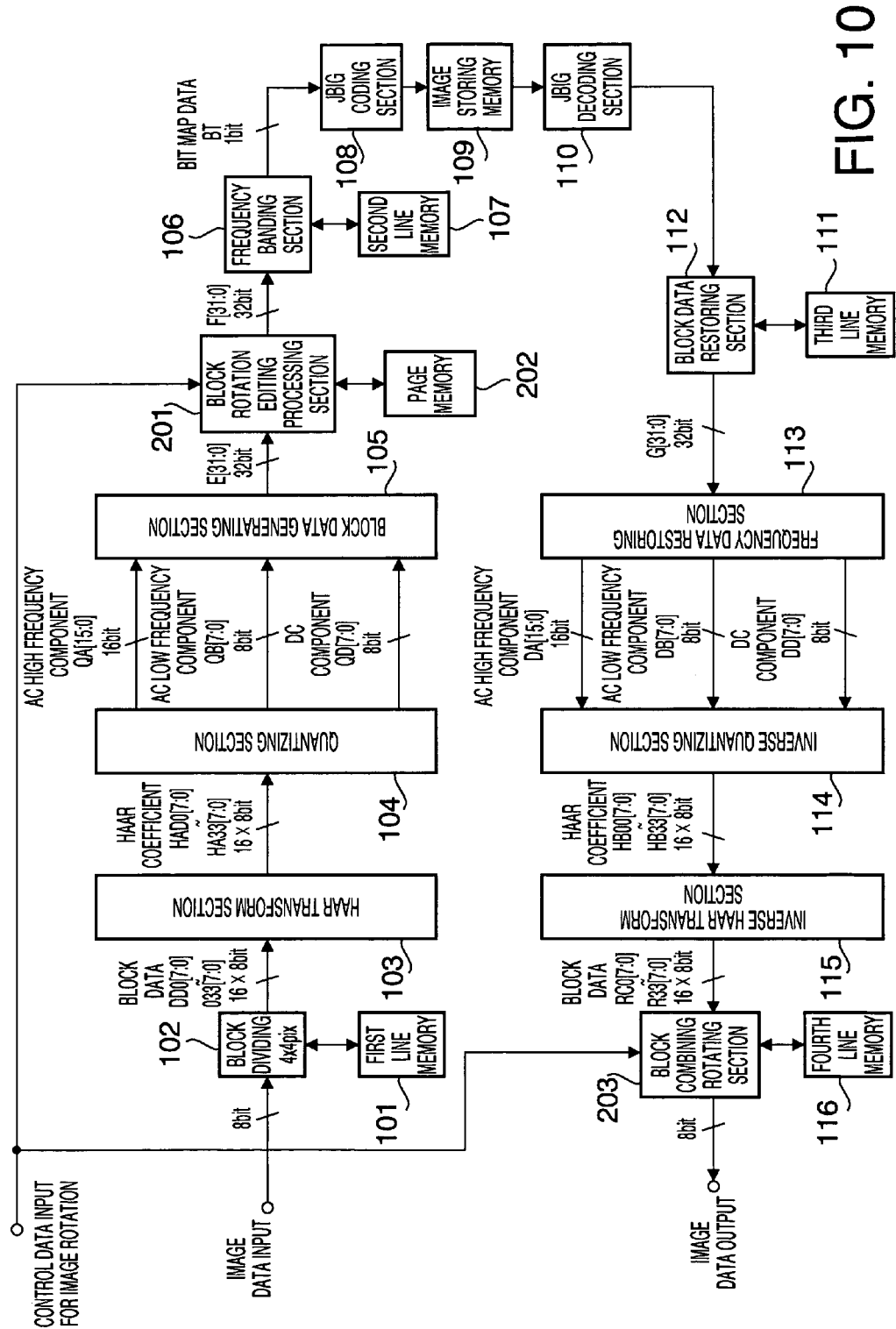
FIG. 10 is a block diagram of an image processing apparatus according to a second embodiment.

FIG. 10 is a block diagram of a configuration pertaining to a series of processes of compression, storage and decompression of an image processing apparatus according to this embodiment. In addition, the same functional sections as in the image processing apparatus of the first embodiment are assigned the same reference numerals as in the first embodiment.

The processing in this embodiment is the same as in that of the first embodiment until multi-bit continuous tone image written in first line memory 101 is subjected to the HAAR transform, the HAAR coefficients are quantized, and thereby block data (E) is generated. In this embodiment, the block data (E) is written in page memory 202 by block rotation editing processing section 201 for each block for one address. This page memory 202 is equivalent to an editing memory. Block rotation editing processing section 201 reads out the block data from page memory 202 at a rotation position address according to rotation control data indicative of an image rotation direction and rotation amount. In addition, the rotation control data may include only rotation direction information if the rotation amount is fixed, may include only a rotation amount if the rotation direction is fixed, or may include only an instruction on whether rotation control is performed if the rotation amount and rotation direction are fixed.

FIG. 11 is a conceptual diagram of the block rotation editing processing by block rotation editing processing section 201. As illustrated in FIG. 11, the arrangement of the block data (E) written in page memory 202 is not rotated, however, the block data (E) is read out in such a manner that the arrangement is rotated 90° counterclockwise by controlling the read address (rotation position address).

Thus, even when image data of 16×8 bits is input, it is possible to edit the image data (block data (E)) of compressed state of 32 bits, whereby it is possible to suppress the capacity of page memory 202 that is an editing memory to one-fourth of the conventional case in this example.

The block data (E) edited by block rotation editing processing section 201 is written in second line memory 107 in its frequency band state as illustrated in FIG. 7 by frequency banding section 108. The data of the same frequency band over adjacent blocks is output as a bit serial data sequence and is subjected to the JBIG coding.

Figure 12:
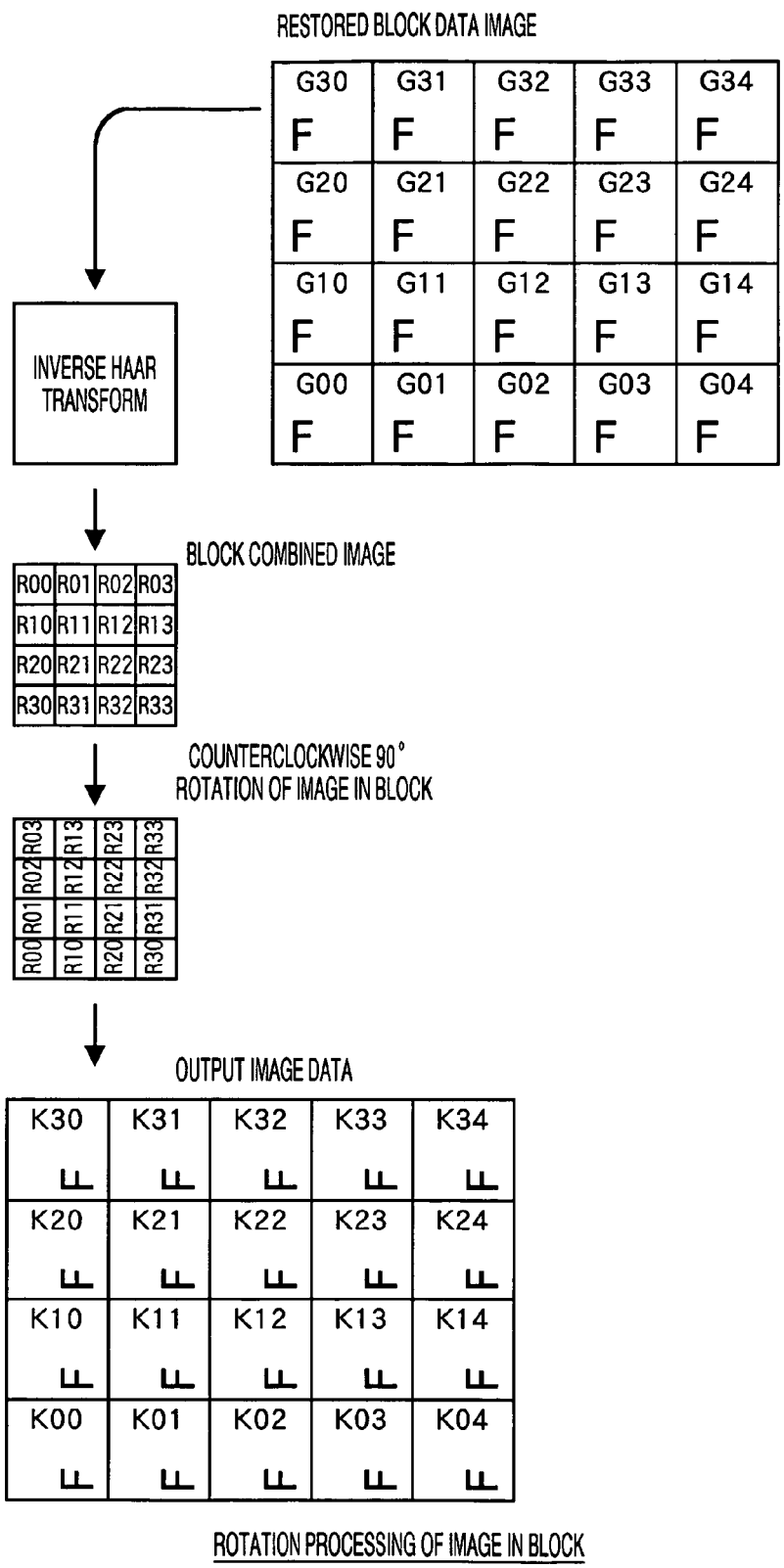
FIG. 12 is a conceptual diagram of image-in-block rotation processing.

Meanwhile, the coded data stored in image storing memory 109 is JBIG-decoded, and is restored by block data restoring section 112 to be block data. FIG. 12 illustrates restored block data. As illustrated in FIG. 12, the direction of an image in the block is not rotated. After frequency components of the restored block data are restored, the restored data is subjected to inverse quantization and then inverse HAAR transform. At the restoring process, the processing up to this point is the same as in the first embodiment.

In this embodiment, 4×4 items of image data (Rxy) restored by the inverse HAAR transform is written in fourth line memory 116 by block combining rotating section 203. As illustrated in FIG. 12, block combining rotating section 203 reads an image in the block from a rotation position address according to the rotation control data from fourth line memory 116 while rotating the image in the block 90° counterclockwise. Thereby, as illustrated in FIG. 12, both the entire page and images in blocks are output as images rotated 90° counterclockwise.

Thus, according to this embodiment, since the rotation editing is performed to block data (E) obtained by quantizing and compressing transform coefficients obtained by subjecting multi-bit image data to orthogonal transform, the capacity of page memory 202 for rotation editing becomes the number of processed pixels×2 bits, whereby it is possible to suppress the memory capacity to one-fourth the conventional capacity (the number of processed pixels×8 bits ).

Further, the block arrangement in a page is rotated by controlling the read address in page memory 202 at the compression process, an image in a block is rotated in the same direction as the page rotation direction at the restoring process, and thereby the image of the page is rotated, whereby it is possible to reduce the compression time.

Figure 13:
FIG. 13 is a conceptual diagram of image combining editing processing.

In addition, in the second embodiment the rotation is explained as an example of the editing processing, however, it may be possible to provide editing functions other than the rotation. For example, it may be possible to perform image combining processing for combining two images on page memory 202 as illustrated in FIG. 13. Also in this case, since the data amount per block is compressed to one-fourth, the capacity of page memory 202 can be reduced largely.

Third Embodiment

An image processing apparatus according to the third embodiment of the present invention will be described next. This embodiment explains an example of providing the image processing apparatus of the second embodiment with an editing function for changing a rotation direction for each page.

Figure 14:
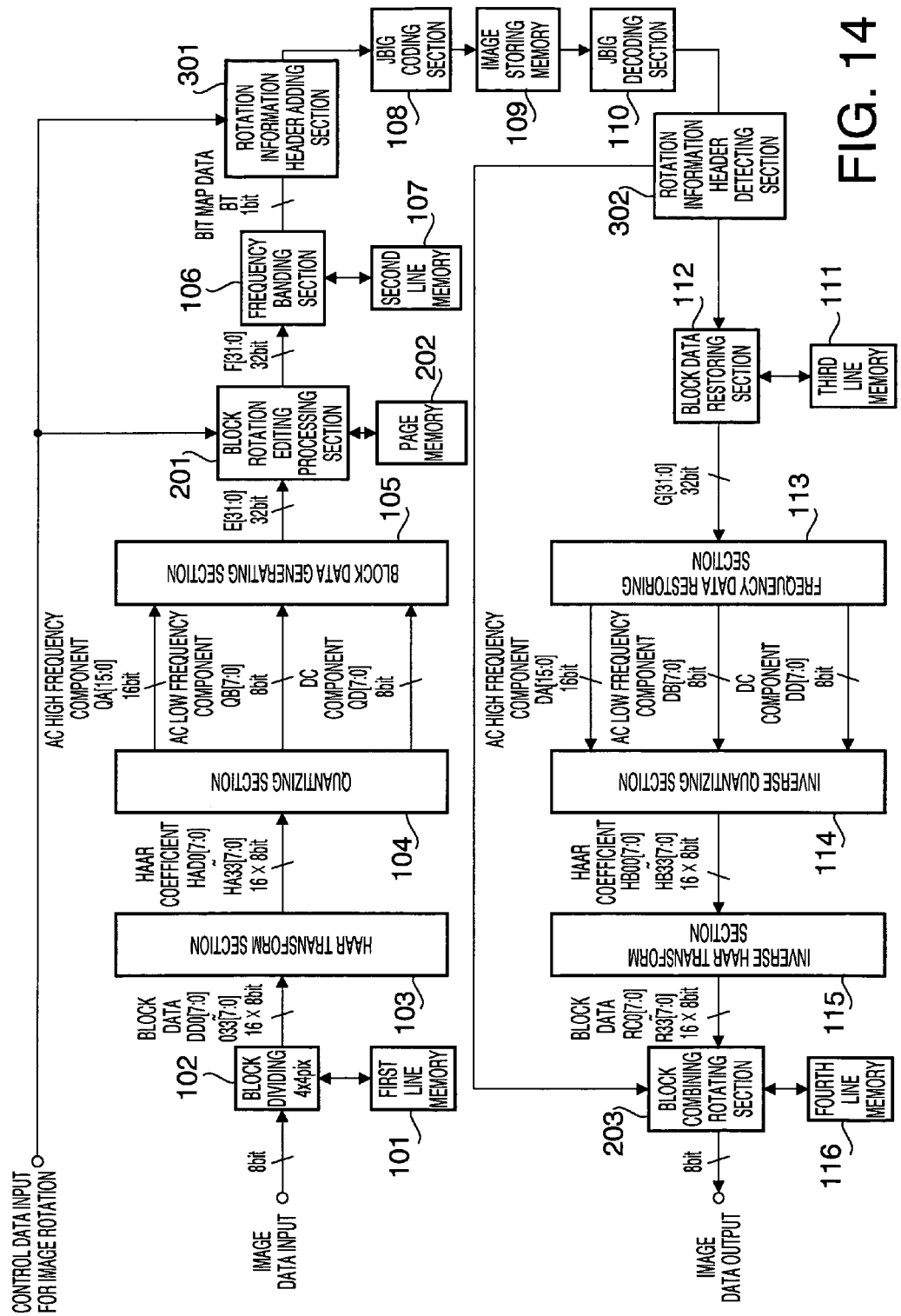
FIG. 14 is a block diagram of an image processing apparatus according to a third embodiment.

FIG. 14 is a block diagram of a configuration pertaining to a series of processes of compression, storage and decompression of an image processing apparatus according to this embodiment. In addition, the same functional sections as in the image processing apparatus of the first and second embodiments are assigned the same reference numerals as in the first and second embodiments.

The processing in this embodiment is the same as in that of the first embodiment until multi-bit continuous tone image written in first line memory 101 is subjected to the HAAR transform, the HAAR coefficients are quantized to generate block data (E), and the block data is sorted into frequency band portions. In this embodiment, after the bit map data (BT) is generated, rotation information is added to a header of the bit map data (BT) according to image rotation control data.

Block rotation editing processing section 201 receives the rotation control data for rotation editing for each page from a CPU, and rotates the block data in the direction instructed for each page to read.

Meanwhile, rotation information header adding section 301 receives rotation information indicative of the rotation direction provided in block rotation editing processing section 201 for each page, and adds the rotation information of a corresponding page to a header of the bit map data of the page provided with the rotation editing.

Thereby, even when the contents of the rotation editing is changed for each page in block rotation editing processing section 201 based on the instruction from the CPU, since the contents of the rotation editing are added to the bit map data of each page, it is possible to judge the rotation direction for each page at the restoring process.

Meanwhile, when the coded data stored in image storing memory 109 is JBIG-decoded, rotation information header detecting section 302 detects the rotation information added to the header of the decoded bit map data to output to block combining rotating section 203 provided at a latter stage of the processing. When block combining rotating section 203 reads out the image data from fourth line memory 116 to rotate, the section 203 controls the processing for reading out the data to rotate using the rotation information on a corresponding block. In other words, the section 203 is capable of detecting, as the rotation direction of an image in a block, the rotation direction of a page to which the block belongs at the compression process, and based on the detected rotation direction, rotates the image in the block in the same direction as the rotation direction of the page at the compression process.

Thus, according to this embodiment, rotation information indicative of a rotation direction is added to the bit map data for each page at the compression process, and the rotation information is extracted from the header of the bit map data at the restoring process to control the rotation direction of an image in a block for each page, whereby even when the rotation direction is different for each original, it is possible to restore the data without separately managing the rotation direction of each original.

Fourth Embodiment

An image processing apparatus according to the fourth embodiment of the present invention will be described next. This embodiment explains an example of enabling JBIG coding section 108 in the image processing apparatus of the first embodiment to be used in both the copy processing explained in the first embodiment and facsimile processing.

FIG. 15 is a block diagram of a configuration pertaining to a series of processes (compression, storage and decompression) for a copy processing sequence and to half-tone processing for a facsimile processing sequence of an image processing apparatus according to this embodiment. In addition, the same functional sections as in the image processing apparatus of the first embodiment are assigned the same reference numerals as in the first embodiment.

In this embodiment, selector 401 for selecting the copy processing or facsimile processing as a selected function is provided between the frequency banding section and JBIG coding section 108. Selector 401 receives its inputs half-tone data output from half-tone processing section 402 and bit map data output from frequency banding section 106, while selecting either half-tone data (HT) or bit map data (BT) according to a function selecting signal provided from the CPU to output. Half-tone processing section 402 is provided in parallel to the compression process of the copy sequence, receives as its input multi-bit image data with continuous tones, performs the half-tone processing on the multi-bit image data, and outputs the half-tone data (HT) to selector 401. In addition, the restoring process is the same as in the first embodiment.

In the image processing apparatus as described above, when the function selecting signal indicative of selecting the facsimile processing is input to selector 401 from the CPU, selector 401 selects the half-tone data output from half-tone processing section 402 to input to JBIG coding section 108. The coded data output from JBIG coding section 108 is input to image storing memory 109, and the stored data is output to be transmitted by facsimile. When the function selecting signal indicative of selecting the copy processing is input to selector 401 from the CPU, the processing for compression, storage and restoring is executed in the same way as in the first embodiment.

In addition, it may be possible to provide a simple binary processing section instead of half-tone processing section 402 to perform facsimile transmission.

FIG. 16 is a diagram illustrating the entire configuration of a multifunctional apparatus provided with an image processing apparatus according to either of the first to fourth embodiments. In FIG. 16, "500" denotes the image processing apparatus of either of the first to fourth embodiments, scanner 501 inputs multi-bit image data with continuous tones to image processing apparatus 500, and printer 502 is a multi-bit printer that prints the multi-bit image data that is compressed, stored and then restored in image processing apparatus 500. When JBIG coding section 108 in image processing apparatus 500 is used as a coder as in the fourth embodiment, the compressed date stored in image storing memory 109 is output from modem 503 to a public network. Image processing apparatus 500 receives the rotation control data and function selecting signal from CPU 504 through an internal bus.

In addition, as described above, a combination of the frequency-band-processing processed bit map data and the JBIG coding enables extremely increased compression efficiency, however, it may be possible to use other coding systems such as, for example, MH and MR, instead of the JBIG coding.

Further, it may be possible to construct an image processing apparatus and multifunctional apparatus by combining the image processing apparatus of the first embodiment and any of the second to fourth embodiments as appropriate.

The present invention is not limited to the above described embodiments, and various variations and modifications may be possible without departing from the scope of the present invention.

This application is based on the Japanese Patent Application No.2000-205083 filed on Jul. 6, 2000, entire content of which is expressly incorporated by reference herein.

What is claimed is:

1. An image processing apparatus, comprising:
    an orthogonal transformer configured to transform multi-bit image data into orthogonal transform coefficients;
    a quantizer configured to quantize the orthogonal transform coefficients for each spatial frequency of the multi-bit image data, the spatial frequencies including a DC component, low frequency AC components, and high frequency AC components, a first number of quantization bits being assigned to the DC component, a second number of quantization bits being assigned to all the low frequency AC components, a third number of quantization bits being assigned to all the high frequency AC components, the second number of quantization bits comprising a multiple of the first number of quantization bits, and the third number of quantization bits comprising a multiple of the first number of quantization bits, the third number of quantization bits being different than the first number of quantization bits;
    a block data generator configured to generate a block of data, the block of data being composed of the quantized data of each spatial frequency;
    a frequency bander configured to rearrange the quantized data in the generated block of data so as to band the quantized data of each spatial frequency and so as to align the quantized data of a spatial frequency of the generated block of data with the quantized data of the same spatial frequency of the next generated block of data, and to output, as bit serial data, the quantized data of the spatial frequency over a plurality of the rearranged blocks; and a coder configured to compress the bit serial data, using a coding system for facsimile communication.

2. The image processing apparatus according to claim 1, wherein the coding system includes a JBIG coding system.

3. The image processing apparatus according to claim 1, further comprising an editor configured to edit the quantized data of the block of data generated by the block data generator, wherein the frequency bander rearranges the edited quantized data.

4. The image processing apparatus according to claim 3, further comprising a memory configured to store the quantized data of the block of data generated by the block data generator, wherein the editor rotates the quantized data by controlling a write address and a read address of the memory based on a control data, the control data indicating a rotation amount and a rotation direction.

5. The image processing apparatus according to claim 4, wherein the editor further adds rotation information to rotated quantized data for each page, the rotation information indicating the rotation amount and the rotation direction for each page.

6. The image processing apparatus according to claim 1, further comprising:

a decoder configured to decompress the compressed bit serial data;

a frequency data restorer configured to restore the decompressed bit serial data to a predetermined block data, the predetermined block data including the quantized data of each spatial frequency;

an inverse quantizer configured to inverse quantize the quantized data for each spatial frequency, and to obtain orthogonal transform coefficients for each spatial frequency; and an inverse orthogonal transformer configured to transform the orthogonal transform coefficients into multi-bit image data.

7. The image processing apparatus according to claim 1, further comprising:

a half-tone processer configured to half-tone process the multi-bit image data to obtain half-tone data;

a function selector configured to select the halftone data when a facsimile transmission is selected, and to select the bit serial data when a copy operation is selected.

8. A multifunction apparatus, comprising:

an image in input configured to scan an original document and to obtain multi-bit image data;

an printer configured to print the multi-bit image data;

a communicator configured to transmit the multi-bit image data; and an image processor, the image processor comprising;

an orthogonal transformer configured to transform the multi-bit image data into orthogonal transform coefficients;

a quantizer configured to quantize the orthogonal transform coefficients for each spatial frequency of the multi-bit image data, the spatial frequencies including a DC component, low frequency AC components, and high frequency AC components, a first number of quantization bits being assigned to the DC component, a second number of quantization bits being assigned to all the low frequency AC components, a third number of quantization bits being assigned to all the high frequency AC components, the second number of quantization bits comprising a multiple of the first number of quantization bits, and the third number of quantization bits comprising a multiple of the first number of quantization bits, the third number of quantization bits being different than the first number of guantization bits;

a block data generator configured to generate a block of data, the block of data being composed of the quantized data of each spatial frequency;

a frequency bander configured to rearrange the quantized data in the generated block of data so as to band the quantized data of each spatial frequency and so as to align the quantized data of a spatial frequency of the generated block of data with the quantized data of the same spatial frequency of the next generated block of data, and to output, as bit serial data, the quantized data of the spatial frequency over a plurality of the rearranged blocks; and a coder configured to compress the bit serial data, using a coding system for facsimile communication.

9. An image processing method comprising:

transforming multi-bit image data into orthogonal transform coefficients;

quantizing the orthogonal transform coefficients for each spatial frequency of the multi-bit image data, the spatial frequencies including a DC component, low frequency AC components, and high frequency AC components, a first number of quantization bits being assigned to the DC component, a second number of quantization bits being assigned to all the low frequency AC components, a third number of quantization bits being assigned to all the high frequency AC components, the second number of quantization bits comprising a multiple of the first number of quantization bits, and the third number of quantization bits comprising a multiple of the first number of quantization bits, the third number of quantization bits being different than the first number of guantization bits;

generating a block of data, the block of data being composed of the quantized data of each spatial frequency;

rearranging the quantized data in the generated block of data so as to band the quantized data for each spatial frequency and so as to align the quantized data of a spatial frequency of the generated block of data with the quantized data of the same spatial frequency of the next generated block of data;

outputting, as bit serial data, the quantized data of the spatial frequency over a plurality of the rearranged blocks; and coding the bit serial data, using a coding system for facsimile communication.

10. The image processing method according to claim 9, further comprising:

decoding the compressed bit serial data;

restoring the decompressed bit serial data to a predetermined block data, the predetermined block data including the quantized data of each spatial frequency;

inverse quantizing the quantized data for each spatial frequency;

obtaining orthogonal transform coefficients for each spatial frequency; and transforming the orthogonal transform coefficients into multi-bit image data.

* * * * *

UNITED STATES PATENT AND TRADEMARK OFFICE
CERTIFICATE OF CORRECTION

| | |
|---|---|
| PATENT NO. | : 7,050,645 B2 |
| APPLICATION NO. | : 09/891165 |
| DATED | : May 23, 2006 |
| INVENTOR(S) | : S. Sato et al. |

It is certified that error appears in the above-identified patent and that said Letters Patent is hereby corrected as shown below:

At column 11, line 50 (claim 8, line 2) of the printed patent, after "image" delete "in".

Signed and Sealed this

Ninth Day of January, 2007

JON W. DUDAS
*Director of the United States Patent and Trademark Office*